United States Patent [19]

Matsuyama et al.

[11] Patent Number: 5,164,031
[45] Date of Patent: Nov. 17, 1992

[54] TAPE SPLICING METHOD AND APPARATUS

[75] Inventors: Masayoshi Matsuyama, Tokyo; Yoichi Kawaharasaki, Kanagawa, both of Japan

[73] Assignee: Sony Magnescale, Inc., Tokyo, Japan

[21] Appl. No.: 678,158

[22] Filed: Apr. 1, 1991

[30] Foreign Application Priority Data

Mar. 30, 1990 [JP] Japan .................................. 2-84480

[51] Int. Cl.⁵ .............................................. B32B 31/18
[52] U.S. Cl. ............................... 156/157; 156/159; 156/258; 156/304.3; 156/502; 156/505; 156/517
[58] Field of Search ............ 156/157, 159, 258, 304.3, 156/502, 505, 506, 517

[56] References Cited

U.S. PATENT DOCUMENTS

| | | | |
|---|---|---|---|
| 2,923,195 | 2/1960 | Reibel et al. | 156/502 |
| 3,337,385 | 8/1967 | Heisler | 156/506 |
| 4,563,234 | 1/1986 | Kubo | 156/505 |
| 4,731,148 | 3/1988 | Karczmer | 156/304.3 |
| 4,878,986 | 11/1989 | Nishikawa | 156/304.3 |

FOREIGN PATENT DOCUMENTS

| | | | |
|---|---|---|---|
| 580846 | 8/1959 | Canada | 156/505 |
| 81877 | 10/1963 | France | 156/505 |
| 136849 | 6/1986 | Japan | 156/506 |
| 671840 | 5/1952 | United Kingdom . | |

*Primary Examiner*—Caleb Weston
*Attorney, Agent, or Firm*—Ronald P. Kananen

[57] ABSTRACT

A cutting/connection device of a tape splicer includes a fixed base member and a vertically displaceable member. The end portions of tapes to be spliced are overlaid one on top of the other on the device. A cutter severs the tapes so that the movable member can be vertically displaced in a manner which brings the free ends of the two tapes to the same level. Under these conditions a strip of adhesive tape is applied to splice the tapes together.

4 Claims, 3 Drawing Sheets

TAPE SPLICING METHOD AND APPARATUS

BACKGROUND OF THE INVENTION

1. Field of the Invention

The present invention relates generally to a method and apparatus for splicing the ends of tape together and more specifically to such a method and apparatus which finds utility in an automated method of splicing the ends of audio and video type tapes.

2. Description of the Prior Art

FIGS. 7 to 10 show previously proposed techniques for connecting the ends of audio or video tapes. When it is desired to connect first and second tapes 1, 2 at a predetermined position, firstly it is necessary, as shown in FIG. 7, to press the ends of the tapes 1, 2 down on a suitable connection block 3 so that they overlap at a position wherein they are to be cut. Next the tapes are severed using a cutter 4. This, as shown in FIG. 9, produces waste cut-offs 1a and 2a. The upper cut-off portion 2a is removed and a short strip of adhesive tape 5 is the applied to the upper surfaces of the tapes 1 and 2.

However, this technique encounters the following drawbacks. As the tapes 1 and 2 are at different levels, the adhesive tape assumes a step-like configuration. Accordingly, if force is applied to the tape in the direction indicated by the arrow 6 in FIG. 11, during the tape application, as the adhesive tape is applied with heat, the join is sufficiently plastic that ends of the tape can slide together and result in the configuration shown in FIG. 12. In this event when the tape is wound onto a reel, the projection which results with the above type of connection, creates a localized thickness in the tape which tends to distort the tape on the reel.

On the other hand, if force is applied in the direction indicated by arrow 7 in FIG. 13, then the ends of the tape 1 and 2 tend to slide apart and an abnormally large gap of the nature shown in FIG. 14, result.

In this event the tape tends to be readily twisted during use and tends to reduce the strength of the splice.

The above defects tend to be particularly noticeable in the case of endless tapes wherein the splice tends to pass over the reproduction heads and the like with a much higher frequency than which open tape configurations.

SUMMARY OF THE INVENTION

It is an object of the present invention to provide a method and apparatus for connecting or splicing the ends of tapes together in a manner which prevents the above mentioned type tape end slippage problem which results from the stepped configuration which inherently results when one strip of tape is laid on top of an other strip.

In brief, the above object is achieved by a technique wherein a cutting/connection device includes a fixed base member and a vertically displaceable member. The end portions of tapes to be spliced are overlaid one on top of the other on the device. A cutter severes the tapes so that the movable member can be vertically displaced in a manner which brings the free ends of the two tapes to the same level. Under these conditions a strip of adhesive tape is applied to splice the tapes together.

More specifically, a first aspect of the present invention comes in a method of splicing two tapes together, which features the steps of: overlaying the end portions of first and second tapes one on top of the other; cutting the tapes at a predetermined position, and vertically displacing one of the first and second tapes so that it assumes the same level as the other of the first and second tapes.

A further aspect of the invention comes in that the above method further includes the step of applying a strip of adhesive tape to the upper surfaces of the first and second tapes while they are at the same level.

Another aspect of the present invention comes in a device for splicing two tapes together which features: a base member having an upper surface on which the tapes can be supported, and a vertically displaceable movable member operatively mounted on said base member, said movable member having an upper surface on which the tapes can be supported, said movable member being adapted to be vertically displaceable by a predetermined distance which is essentially equal to the thickness of a tape which is supported thereon.

Yet another aspect of the present invention comes in a tape splicing device which features: a stationary base member having a step portion; a movable member which seats on a horizontal surface of the step portion, said movable member being spaced from a vertical surface of the step portion by a predetermined small distance, guide means operatively connecting the movable member with the base member in a manner which renders the movable member displaceable in a direction which is parallel to the vertical surface of the step portion, said guide means including means for limiting the amount of vertical displacement the movable member can undergo.

DETAILED DESCRIPTION OF THE PREFERRED EMBODIMENT

Figure 1:
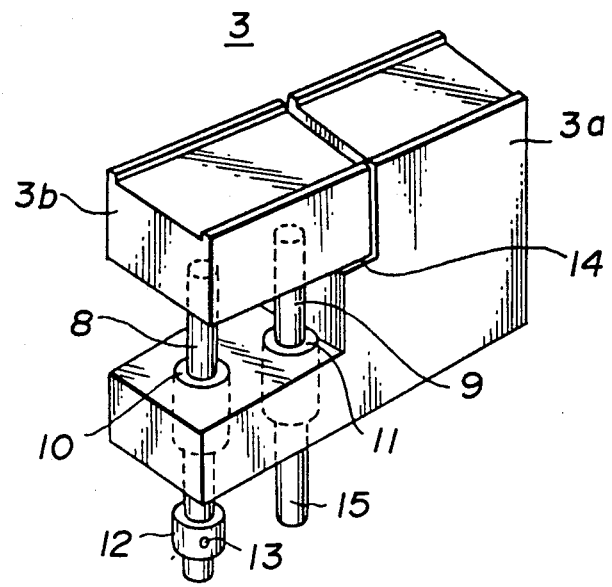
FIG. 1 is a perspective drawing showing an embodiment of the present invention.

FIG. 1 shows an embodiment of the apparatus used in connection with the present invention, in perspective form. As shown, this arrangement includes a cutting/connection section 3 which comprises a fixed base member 3a and a vertically movable member 3b. Rods 8 and 9 are rigidly connected at their upper ends to the vertically movable member 3b, and slidably disposed through bearings 10 and 11 disposed in the base member 3a. The bearing 10, 11 are provided to smooth the reciprocal movement of the rods 8 and 9 therethrough. A stopper 12 is attached to the lower end of rod 8 in a manner which limits the amount of upward displacement the movable member 3b can undergo. By adjusting the position of the stopper 12 the amount of vertical displacement can be accordingly adjusted. A step 14 formed on the base member 3a is arranged to engage the lower side of the movable member 3b in a manner which limits the downward movement of the movable member 3b. In this embodiment the step 14 is arranged so that when the movable member 3b seats thereon, the upper surfaces of the fixed and movable members 3a, 3b assume the same level. In the illustrated embodiment, the upper surfaces of the base and movable members 3a, 3b are formed with tape guides in the form of channel-like recesses.

The lower end of the rod 9 is formed with a control point 15.

Although not shown in the drawings, when the illustrated arrangement is put into actual use it is combined in splicing device which further includes a cutter which is arranged to extend down into the vertically extending space defined above the step 14 between the juxtaposed side walls of the base and movable member 3a, 3b. The splicing device further includes tape clamps which are operatively connected with a source of vacuum and which utilize pressure differential to pick up and hold a strip or strips of tape so that they can be moved onto the top of the apparatus shown in FIG. 1 ready for cutting and/or subsequent connection via the application of a strip of adhesive tape or the like.

FIGS. 2 to 6 show the manner in which the apparatus which characterizes the present invention is used in connection with the cutting and connecting of of strips of tape. As will be noted the same numerals as used in connection with disclosure of the prior art are used to denote the similar elements in FIGS. 1 to 6.

Figure 2:
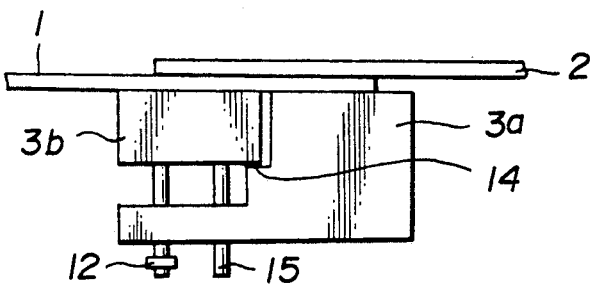
FIGS. 2 to 6 show the operations which characterizes the present invention.
Figure 3:
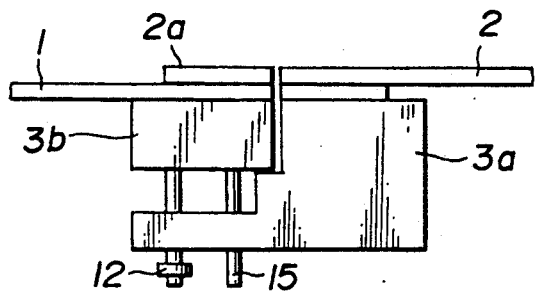

In operation, first and second strips of tape 1, 2 which are to be spliced together are arranged to that the ends portions thereof, are placed one on top of the other in an overlapping relationship on top of the cutting/connecting section 3, as shown in FIG. 2. Although not shown, tape clamps are applied to hold the tapes in place and prevent slippage and/or unwanted movement. A cutter is then used to sever the strips and produce the arrangement shown in FIG. 3. As mentioned above, the cutter can pass into the vertically extending space between the base and movable members 3a, 3b during the cutting of the two tapes 1, 2.

Figure 4:
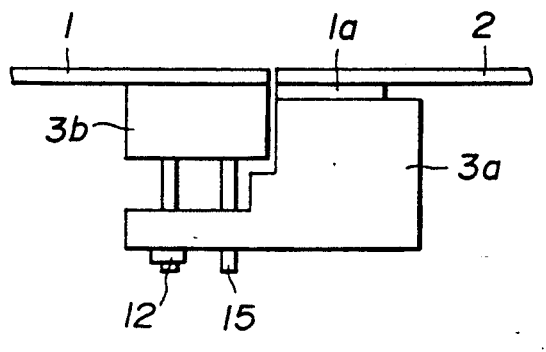
Figure 5:
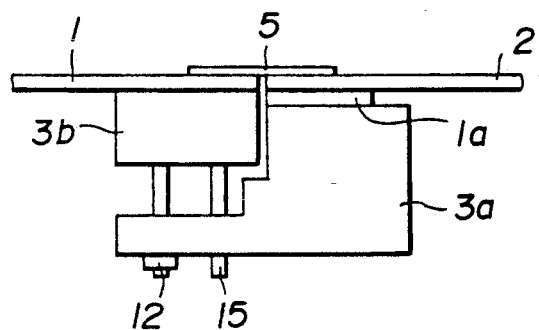

Following the cutting operation, the movable member 3b is displace upwardly by a non-illustrated servo device until the stopper 12 engages the lower surface of the base member 3a and the apparatus assumes the condition shown in FIG. 4. Although not shown, the cut-off 2a is removed such as by the use of one of the above mentioned tape clamps, which can suck the cut-off against the lower side of the same and carry it to a position wherein disposal is facilitated.

As will be appreciated from FIG. 4, the amount of vertical displacement that the movable member 3b can undergo is set to be essentially the same as the thickness of a strip of tape. Accordingly, as a result of the vertical movement of the movable member 3a the upper surfaces of the tapes 1 and 2 are induced to assume the same level. Under such conditions, when a non-illustrated applicator presses a strip of adhesive tape 5 down onto the upper surface of the tapes 1 and 2 (FIG. 5), the likelihood of the slippage problem disclosed in connection with FIGS. 7 to 14 is eliminated and a highly suitable splicing of the two tapes is achieved.

Figure 6:
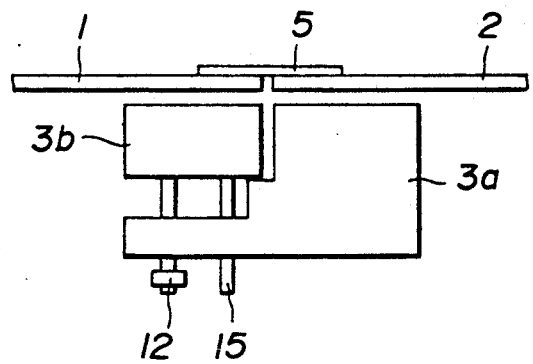
Figure 7:
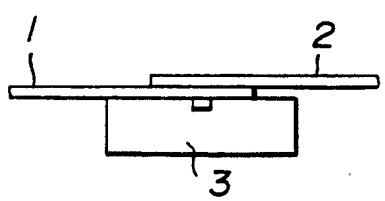
FIGS. 7 to 14 show the prior art connection technique discussed in the opening paragraphs of the present invention.
Figure 8:
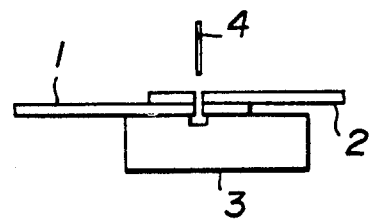
Figure 9:
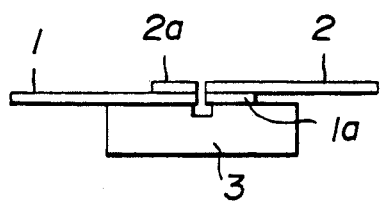
Figure 10:
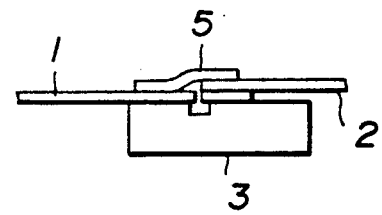
Figure 11:
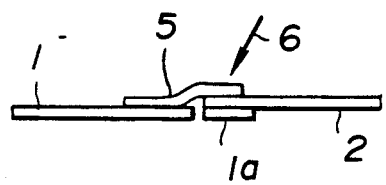
Figure 12:
Figure 13:
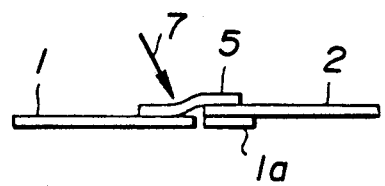
Figure 14:
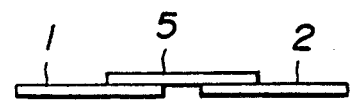

Following the application of the adhesive tape 5 a downwardly acting force is applied in a manner wherein the movable member 3b is lowered until it rests on the step 14 and the situation illustrated in FIG. 6 is achieved.

With the above technique, two strips of tape can be spliced together in a manner which prevents the formation of abnormally thick and lumpy joints and thus obviates the problem encountered with the prior art wherein tape distortion is caused when the tape is wound onto a reel. The inventive technique also prevents the formation of abnormally large gaps between the ends of the spliced tapes and thus prevents the loss of joint strength which tends to accompany joints of the nature illustrated in FIG. 14.

Further, the invention permits the above type of joining to be carried out with a highly compact arrangement. For example, if two tape passes are provided it is possible to achieve tape splicing with the highly compact device which also ensures that the accuracy of the joining is maintained.

We claim:
1. In a tape splicing device
a stationary base member having a step portion,
a movable member which seats on a horizontal surface of the step portion, said movable member being spaced from a vertical surface of the step portion by a predetermined small distance;
guide means operatively connecting the movable member with the base member in a manner which renders the movable member displaceable in a direction which is parallel to the vertical surface of the step portion, said guide means including means for limiting the amount of vertical displacement the movable member can undergo.

2. A tape splicing device as claimed in claim 1 wherein the upper surface of said stationary base member and the upper surface of said movable member are formed with guide means in which overlapping tapes can be set.

3. A device for splicing two tapes together, comprising:
a base member having a surface on which the tapes are supported in an overlaid relationship to each other; and
a movable member operatively mounted on said base member, said movable member having a surface on which the tapes are supported in the overlaid relationship to each other, said surface of said movable member being flush with said surface of said base member, said movable member being structurally adapted to be displaceable by a predetermined distance in a direction perpendicular to a flat surface of the tape, said predetermined distance being essentially equal to a thickness of the tape supported on said movable member.

4. A method of splicing two tapes together, comprising the steps of:
overlaying end portions of the tapes one on top of the other;
cutting the tapes at a predetermined position so that the tapes each are divided into cut-off ends and remaining portions;
removing said cut-off end of one of the tapes;
displacing said remaining portion of said one of the tapes by a predetermined distance in a direction perpendicular to a flat surface of said one of the tapes, so as to be flush aligned with said remaining portion of the other of the tapes, said predetermined distance being essentially equal to thickness of said one of the tapes; and
applying a strip of adhesive tape to said remaining portions flush aligned with each other.

* * * * *